US010550716B2

(12) United States Patent
Saito et al.

(10) Patent No.: US 10,550,716 B2
(45) Date of Patent: Feb. 4, 2020

(54) GAS TURBINE INLET GUIDE VANE CONTROL DEVICE, SYSTEM AND CONTROL METHOD

(71) Applicant: MITSUBISHI HITACHI POWER SYSTEMS, LTD., Kanagawa (JP)

(72) Inventors: Akihiko Saito, Tokyo (JP); Takashi Sonoda, Tokyo (JP); Yoshifumi Iwasaki, Kanagawa (JP); Koji Takaoka, Kanagawa (JP); Ryuji Takenaka, Kanagawa (JP); Kozo Toyama, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 418 days.

(21) Appl. No.: 15/329,413

(22) PCT Filed: Jun. 16, 2015

(86) PCT No.: PCT/JP2015/067245
§ 371 (c)(1),
(2) Date: Jan. 26, 2017

(87) PCT Pub. No.: WO2016/031355
PCT Pub. Date: Mar. 3, 2016

(65) Prior Publication Data
US 2017/0211409 A1 Jul. 27, 2017

(30) Foreign Application Priority Data
Aug. 26, 2014 (JP) ................. 2014-171775

(51) Int. Cl.
*F02C 9/28* (2006.01)
*F02C 9/20* (2006.01)
(Continued)

(52) U.S. Cl.
CPC ............. *F01D 17/16* (2013.01); *F01D 17/24* (2013.01); *F02C 7/042* (2013.01); *F02C 9/20* (2013.01);
(Continued)

(58) Field of Classification Search
CPC .......... F01D 17/16; F01D 17/24; F02C 7/042; F02C 9/00; F02C 9/16; F02C 9/20;
(Continued)

(56) References Cited

U.S. PATENT DOCUMENTS

| 7,422,414 B2 * | 9/2008 | Fujii ..................... F02C 9/20 415/1 |
| 7,707,814 B2 * | 5/2010 | Sonoda ................. F02C 9/28 60/243 |

(Continued)

FOREIGN PATENT DOCUMENTS

| JP | 2-11832 | 1/1990 |
| JP | 8-82228 | 3/1996 |

(Continued)

OTHER PUBLICATIONS

Office Action dated Dec. 5, 2017 in Japanese Application No. 2014-171775, with English Translation.

(Continued)

*Primary Examiner* — Jason H Duger
(74) *Attorney, Agent, or Firm* — Wenderoth, Lind & Ponack, L.L.P.

(57) ABSTRACT

A control device is configured to control a gas turbine that is configured to compress a suctioned air with a compressor to obtain compressed air, mix a fuel supplied from a combustor with the compressed air to burn the fuel and the compressed air to generate a combustion gas, operate a turbine with the combustion gas to rotate a rotor, and discharge the combustion gas that has operated the turbine (Continued)

as a flue gas. The compressor includes an inlet guide vane which is capable of adjusting a degree of opening and is on an air-suction side, and the control device is configured to execute temperature adjustment control to control the degree of opening of the inlet guide vane along a temperature adjustment line indicating an upper limit temperature of a flue gas temperature defined according to a load of the gas turbine.

4 Claims, 5 Drawing Sheets

(51) Int. Cl.
    *F02C 9/54*     (2006.01)
    *F01D 17/16*     (2006.01)
    *F01D 17/24*     (2006.01)
    *F02C 7/042*     (2006.01)

(52) U.S. Cl.
    CPC ............... *F02C 9/28* (2013.01); *F02C 9/54* (2013.01); *F05D 2270/112* (2013.01)

(58) Field of Classification Search
    CPC ...... F02C 9/28; F02C 9/50; F02C 9/54; F02C 9/56; F05D 2270/112
    See application file for complete search history.

(56) References Cited

U.S. PATENT DOCUMENTS

| | | | | |
|---|---|---|---|---|
| 8,694,170 | B2* | 4/2014 | Sonoda | ............... F01D 17/16 |
| | | | | 60/39.27 |
| 10,161,317 | B2* | 12/2018 | Sonoda | ............... F02C 9/20 |
| 2010/0198419 | A1 | 8/2010 | Sonoda et al. | |

FOREIGN PATENT DOCUMENTS

| | | |
|---|---|---|
| JP | 2007-40171 | 2/2007 |
| JP | 2008-75578 | 4/2008 |
| JP | 2009-114956 | 5/2009 |
| JP | 2009-156086 | 7/2009 |
| JP | 2010-285955 | 12/2010 |
| JP | 2011-111996 | 6/2011 |
| JP | 5355057 | 9/2013 |
| JP | 2014-47728 | 3/2014 |
| JP | 5490023 | 3/2014 |

OTHER PUBLICATIONS

Written Opinion of the International Searching Authority dated Sep. 29, 2015 in corresponding International Application No. PCT/JP2015/067245.
Office Action dated May 30, 2017 in Japanese Application No. 2014-171775, with English translation.
International Search Report dated Sep. 29, 2015 in International (PCT) Application No. PCT/JP2015/067245.

* cited by examiner

GAS TURBINE INLET GUIDE VANE CONTROL DEVICE, SYSTEM AND CONTROL METHOD

FIELD

The present invention relates to a control device of a system such as a gas turbine, the control device executing temperature adjustment control, and a system and a control method.

BACKGROUND

A typical gas turbine is configured from a compressor, a combustor, and a turbine. Air taken in through an air intake is compressed by the compressor, so that the air becomes high-temperature and high-pressure compressed air. A fuel is supplied to the compressed air, and the fuel and the compressed air are burned in the combustor, so that a high-temperature and high-pressure combustion gas (working fluid) is obtained. The turbine is driven by the combustion gas, and a generator coupled with the turbine is driven. The combustion gas that has driven the turbine is discharged as a flue gas from a discharge side of the turbine.

A control device that controls such a gas turbine executes temperature adjustment control operation of the gas turbine by adjusting an air amount and a supply amount of the fuel to be taken into the compressor so that a turbine inlet temperature of the turbine into which the combustion gas flows in does not exceed an upper limit temperature set in advance. This is because, while performance (work efficiency) becomes higher as the turbine inlet temperature is higher, it is difficult for high-temperature components around a turbine inlet to bear a heat load if the turbine inlet temperature becomes too high. To be specific, in the temperature adjustment control, the operation of the gas turbine is controlled such that the flue gas temperature from the turbine does not exceed a temperature adjustment line indicating an upper limit temperature of the flue gas temperature defined according to gas turbine state amounts such as a load (generator output) and a pressure ratio of the gas turbine. Here, the temperature adjustment line is defined as a mathematical function in which the upper limit temperature of the flue gas temperature becomes higher as the load of the gas turbine becomes smaller while the upper limit temperature of the flue gas temperature becomes lower as the load of the gas turbine becomes larger.

As the control device of the gas turbine, which performs the temperature adjustment control, there are ones described in Japanese Patent Publication No. 2008-75578 and Japanese Patent Publication No. 2007-40171. In an operation control device of a gas turbine of Japanese Patent Publication No. 2008-75578, an inlet guide vane is provided on an air-suction side of a compressor, and the degree of opening of the inlet guide vane is set according to a generator output from a generator output sensor on the basis of a relationship of the degree of opening of the inlet guide vane with respect to an output value of the generator. Further, in an inlet guide vane control device of a gas turbine of Japanese Patent Publication No. 2007-40171, an inlet guide vane is provided on an air-suction side of a compressor, and the degree of opening of the inlet guide vane corresponding to a generator output (gas turbine output) after correction of a sucked air temperature is set.

Technical Problem

As described above, the degree of opening of the inlet guide vane is set on the basis of the gas turbine output (actual output). Therefore, for example, in a case of controlling the gas turbine output to obtain a target request output value of the gas turbine at the time of load increase where a load of the gas turbine becomes large, the control device of the gas turbine increases a supply amount of the fuel on the basis of a deviation of the request output value and the gas turbine output. If the supply amount of the fuel is increased, the output of the gas turbine is increased. Therefore, the control device makes the degree of opening of the inlet guide vane large with the increase in the output of the gas turbine. Therefore, at the time of load increase, the supply amount of the fuel is more likely to be increased, and thus a fuel-air ratio (the supply amount of the fuel/the air-suction amount) remains at high levels. Accordingly, the turbine inlet temperature and the flue gas temperature remain at high levels in proportion to the fuel-air ratio.

By the way, the gas turbine performs operation according to a load, to be specific, performs full load operation and part load operation. Usually, in a case where the full load operation is performed, the temperature adjustment control is executed so that the turbine inlet temperature reaches around the upper limit temperature to exhibit performance of the gas turbine. In the temperature adjustment control, to be specific, the operation of the gas turbine is controlled such that the flue gas temperature at the time of full load operation becomes around the temperature adjustment line.

Meanwhile, in the part load operation, the temperature adjustment control is not executed to secure responsibility of the gas turbine output to load variation. That is, the load of the gas turbine is controlled at the flue gas temperature lower than the upper limit temperature of the temperature adjustment line so that the flue gas temperature is not limited by the upper limit temperature of the temperature adjustment line.

Further, in recent years, even in the part load operation, the temperature adjustment control is sometimes executed so that the turbine inlet temperature reaches around the upper limit temperature in order to improve the performance of the gas turbine. To be specific, in the temperature adjustment control, the operation of the gas turbine is controlled such that the flue gas temperature at the time of part load operation becomes around the temperature adjustment line.

However, at the time of part load operation, in a case where the temperature adjustment control is performed such that the flue gas temperature becomes around the temperature adjustment line, if the load to the gas turbine varies, the flue gas temperature may be limited by the temperature adjustment line. This is because, as described above, the turbine inlet temperature and the flue gas temperature remain at high levels as the fuel-air ratio remains at high levels at the time of load increase. Therefore, it may be difficult for the gas turbine to adjust the gas turbine output according to the load variation.

Further, at the time of part load operation, in a case of performing the temperature adjustment control such that the flue gas temperature becomes around the temperature adjustment line, the suction amount of the air taken in through the air intake is sometimes decreased due to disturbance such as the load variation. In this case, the flue gas temperature rises. Therefore, in the temperature adjustment control, so-called load fall in which the load of the gas turbine is made small is caused. That is, since the upper limit temperature of the flue gas temperature in the temperature adjustment line becomes higher as the load of the gas turbine becomes smaller, the gas turbine load is made small to make the upper limit temperature of the flue gas temperature high in the temperature adjustment control when the flue gas temperature rises. At this time, the suction amount of the air is adjusted by the degree of opening of the inlet guide vane, and the degree of opening of the inlet guide vane is set on the basis of the gas turbine output. Therefore, in the temperature adjustment control, control to decrease the suction amount of the air by closing the degree of opening of the inlet guide vane is performed when the load of the gas turbine is decreased and the gas turbine output becomes small, and the flue gas temperature rises again, accordingly. Therefore, the load of the gas turbine continuously falls.

SUMMARY

Therefore, an object of the present invention is to provide a control device that favorably executes temperature adjustment control at the time of load variation while improving performance of a system such as a gas turbine at the time of part load operation, and a system and a control method.

Solution to Problem

A control device of a present invention is a control device of a system that compresses a suctioned air with a compressor to obtain compressed air, mixes a fuel supplied from a combustor with the compressed air to burn the fuel and the compressed air to obtain a combustion gas, operates a turbine with the generated combustion gas to rotate a rotor, and discharges the combustion gas that has operated the turbine as a flue gas. The compressor includes an inlet guide vane capable of adjusting the degree of opening and provided on an air-suction side, and temperature adjustment control to control the degree of opening of the inlet guide vane is executed along a temperature adjustment line indicating an upper limit temperature of a flue gas temperature defined according to a load of the system, and the degree of opening is set on the basis of an output request value of the system.

Further, a control method of the present invention is a method of controlling a system that compresses a suctioned air with a compressor to obtain compressed air, mixes a fuel supplied from a combustor with the compressed air to burn the fuel and the compressed air to obtain a combustion gas, operates a turbine with the generated combustion gas to rotate a rotor, and discharges the combustion gas that has operated the turbine as a flue gas. The compressor includes an inlet guide vane capable of adjusting the degree of opening and provided on an air-suction side, and temperature adjustment control to control the degree of opening of the inlet guide vane is executed along a temperature adjustment line indicating an upper limit temperature of a flue gas temperature defined according to a load of the system, and the degree of opening is set on the basis of an output request value of the system.

According to this configuration, the degree of opening of the inlet guide vane can be set on the basis of the output request value of the system. Therefore, the degree of the opening of the inlet guide vane can be made large before the supply amount of the fuel is increased at the time of load increase of the system. Therefore, the fuel-air ratio can remain at lower levels than a case of setting the degree of opening of the inlet guide vane on the basis of an output of the system. Accordingly, rises of the turbine inlet temperature and the flue gas temperature can be suppressed. Therefore, limitation on the output of the system and occurrence of the load fall due to the flue gas temperature reaching the upper limit temperature can be suppressed at the time of load increase in the part load operation. As described above, at the time of part load operation, the output of the system can be easily changed along the temperature adjustment line according to the load variation, and the part load operation can be performed along the temperature adjustment line. Therefore, at the time of part load operation, the system can be operated at rated performance. Note that the rated performance is performance where the work efficiency of the gas turbine becomes optimum when a predetermined load is applied to the system such as the gas turbine from a generator. Further, the system can be applied to a gas engine system or the like, in addition to the gas turbine that generates electricity.

Further, it is preferable that governor control to control an output of the system on the basis of a governor set value with which the number of revolutions of the rotor becomes a set number of revolutions is executed, the output request value is the governor set value at the time of governor control, and the degree of opening is set on the basis of the governor set value.

According to this configuration, the degree of opening of the inlet guide vane can be set on the basis of the governor set value at the time of governor control. Therefore, the fuel-air ratio can remain at low levels at the time of load increase even in the time of governor control.

Further, it is preferable that an actual output value of the system and the output request value are compared, and a higher value is selected, and the degree of opening is set on the basis of the actual output value or the output request value selected as the higher value.

According to this configuration, since the output request value of the system becomes high at the time of load increase, the degree of opening of the inlet guide vane is set on the basis of the output request value. Meanwhile, since the actual output value of the system (the output of the system) becomes high at the time of load decrease, the degree of opening of the inlet guide vane is set on the basis of the output of the system. Therefore, not only at the time of load increase but also at the time of load decrease, the fuel-air ratio can remain at low levels. That is, since the actual output value of the system becomes higher than the output request value of the system at the time of load decrease, the degree of opening of the inlet guide vane becomes small after the supply amount of the fuel is decreased. In this way, at the time of load increase and at the time of load decrease, the rises of the turbine inlet temperature and the flue gas temperature can be suppressed. Therefore, limitation on the output of the system due to the flue gas temperature reaching the upper limit temperature can be suppressed.

Further, it is preferable that delay control to delay and set setting of the degree of opening based on the output request value is executed at the time of load decrease where the load of the system falls.

According to this configuration, at the time of load decrease, setting of the degree of opening can be delayed. Therefore, at the time of load decrease, the degree of opening of the inlet guide vane can be set to be small in a delayed manner after the supply amount of the fuel is decreased. In this way, at the time of load decrease, the rises of the turbine inlet temperature and the flue gas temperature can be suppressed. Therefore, limitation on the output of the system due to the flue gas temperature reaching the upper limit temperature can be suppressed.

Further, it is preferable that fuel control to control a supply amount of the fuel supplied from the combustor is executed on the basis of a fuel command value, and the degree of opening is set on the basis of the output request value generated on the basis of the fuel command value.

According to this configuration, the degree of opening of the inlet guide vane can be set on the basis of the fuel command value. Therefore, at the time of load increase of the system, the degree of opening of the inlet guide vane can be made large before the supply amount of the fuel is increased. Therefore, the fuel-air ratio can remain at lower levels than the case of setting the degree of opening of the inlet guide vane on the basis of the output of the system.

Further, it is preferable that degree of opening advanced control to set a larger degree of opening than the degree of opening set on the basis of the output request value is executed at the time of load increase where the load of the system rises.

According to this configuration, when the load change amount is large, the upper limit temperature of the temperature adjustment line is quickly decreased with the load increase. In this case, the flue gas temperature is decreased in a delayed manner, and thus the flue gas temperature is limited to the upper limit temperature, and it becomes difficult to change the output of the system, accordingly. Therefore, in a case where the load change amount at the time of load increase is large, the degree of opening advanced control is executed so that the degree of opening of the inlet guide vane becomes larger, thereby to decrease the flue gas temperature to become lower than the upper limit temperature of the temperature adjustment line. Therefore, the output of the system can be favorably changed without limiting the flue gas temperature to the temperature adjustment line. Note that when the change amount of the load variation is large is when the gas turbine is applied as the system or at the time of quick start operation of the gas turbine or at the time of frequency variation of the generator.

A system of the present invention is a system including a compressor that compresses suctioned air to obtain compressed air, a combustor that supplies a fuel to the compressed air to burn the fuel and the compressed air to generate a combustion gas, a turbine that is operated by the generated combustion gas, and the control device described above.

According to this configuration, performance at the time of part load operation can be increased, and further, the temperature adjustment control for the load variation can be favorably executed.

DESCRIPTION OF EMBODIMENTS

Hereinafter, embodiments according to the present invention will be described in detail on the basis of the drawings. Note that the present invention is not limited by the embodiments. Further, configuration elements in the embodiments include elements easily replaceable by a person skilled in the art and elements substantially the same. Further, the configuration elements described below can be appropriately combined, and embodiments can be combined when there is a plurality of embodiments.

First Embodiment

Figure 1:
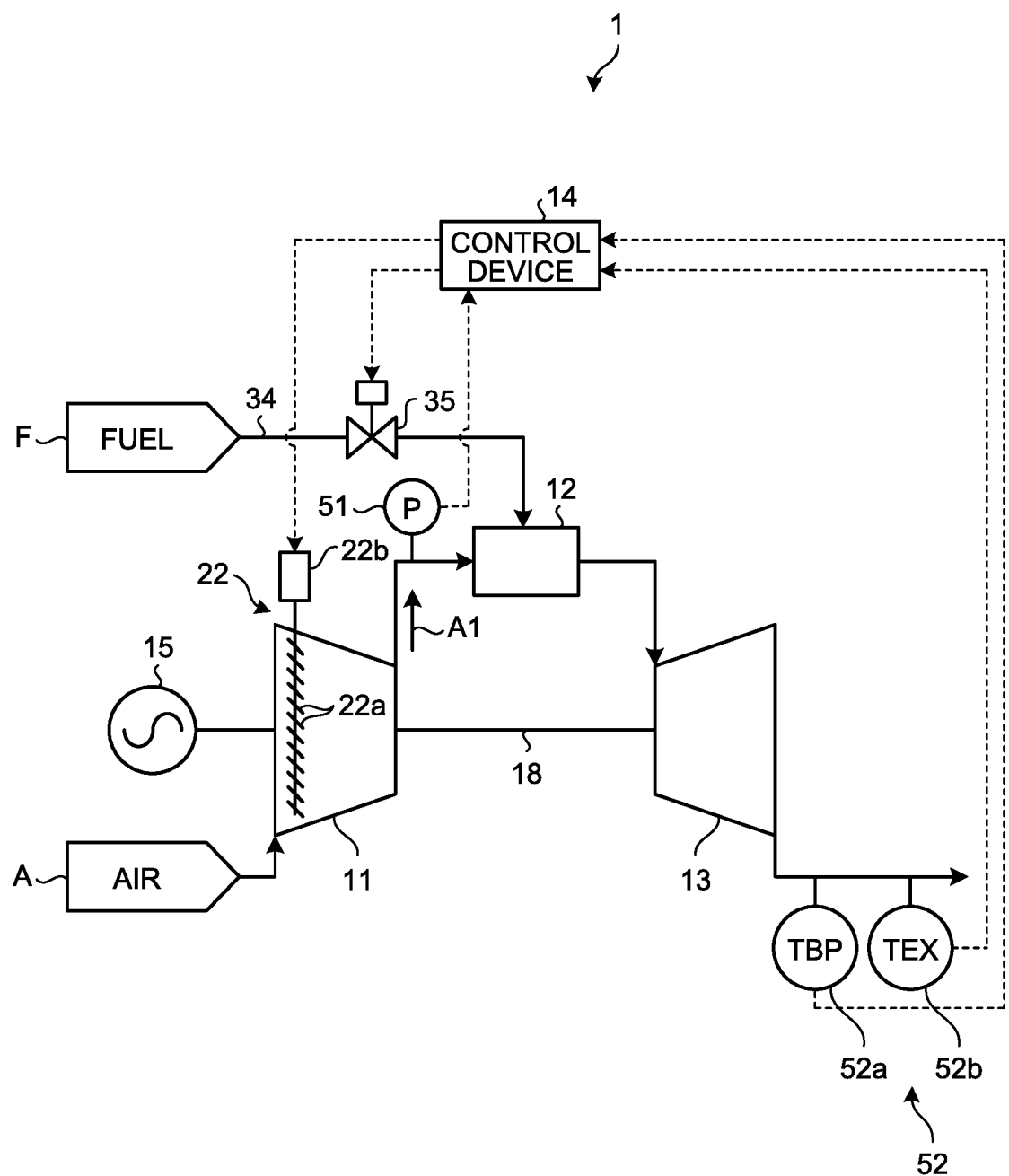
FIG. 1 is a schematic view illustrating a gas turbine of a first embodiment.
Figure 2:
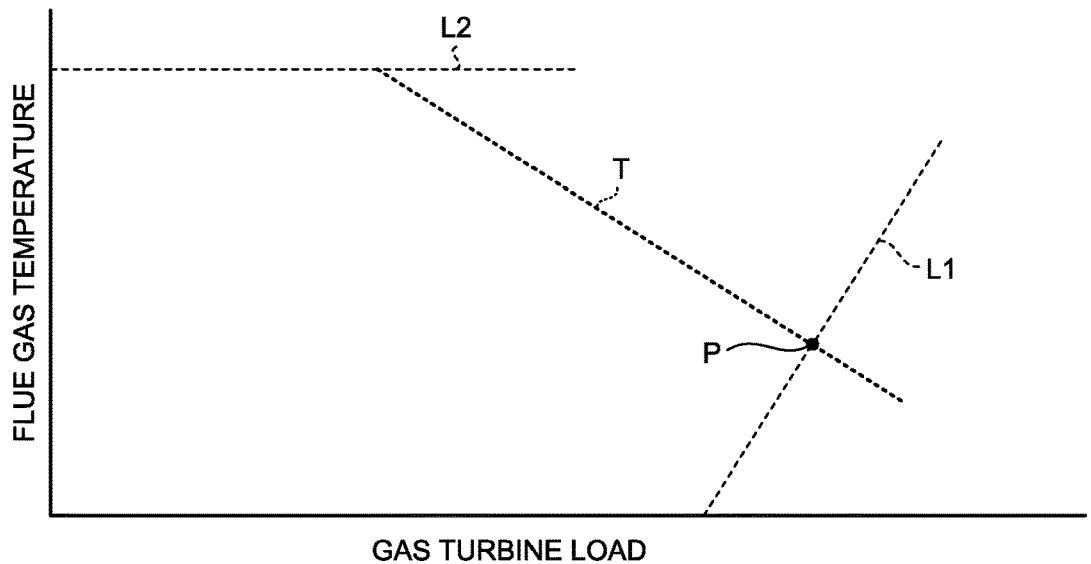
FIG. 2 is a graph illustrating a temperature adjustment line on which an upper limit temperature of a flue gas is changed according to a load of the gas turbine.
Figure 3:
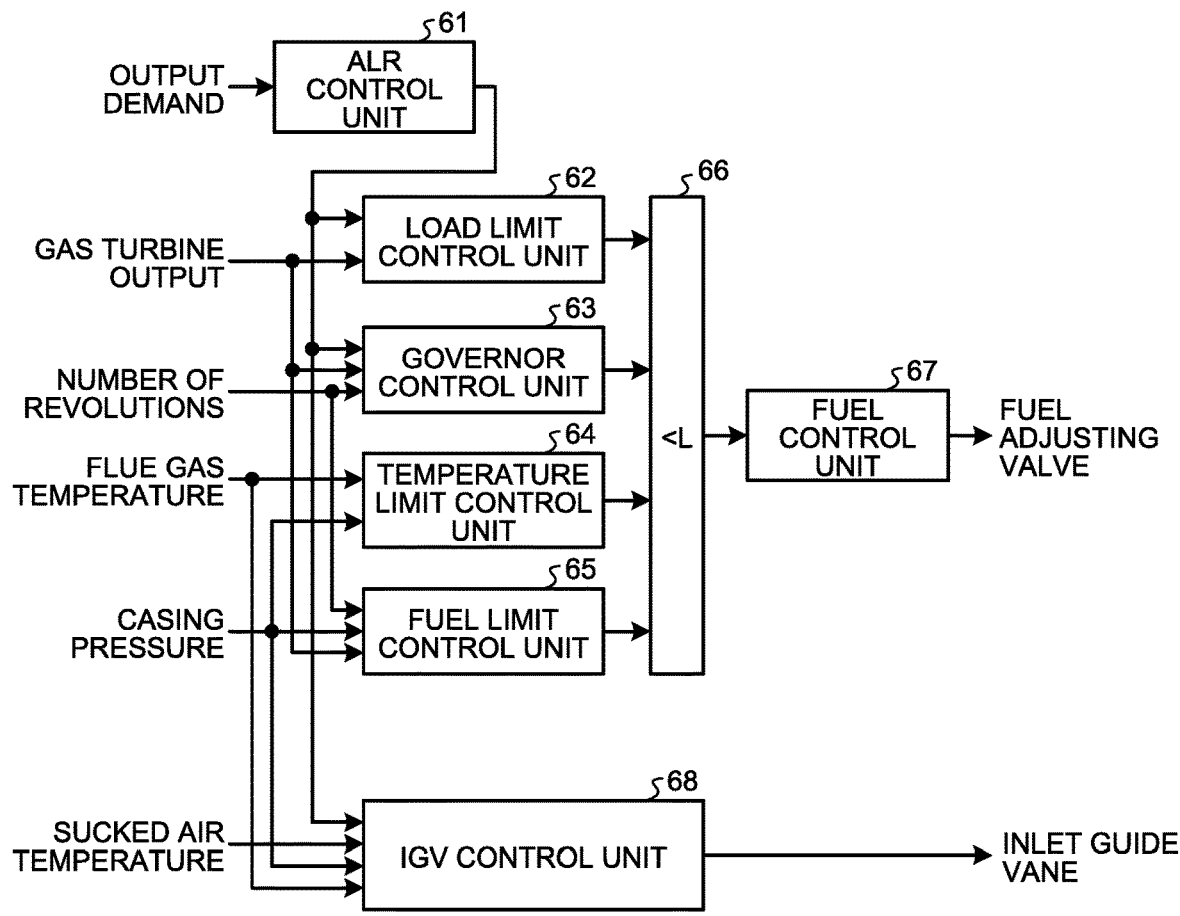
FIG. 3 is a block diagram regarding control of a control device.
Figure 4:
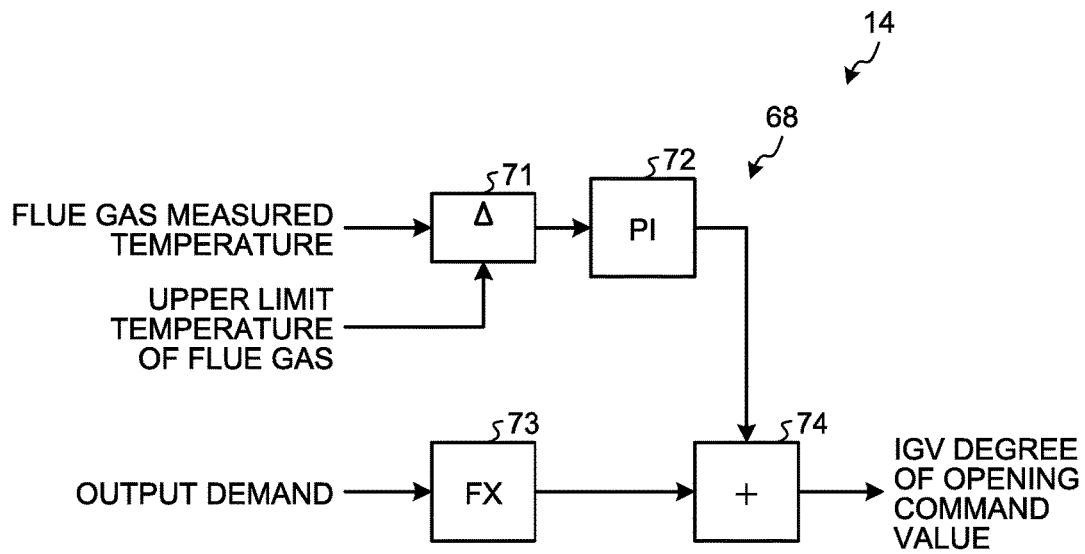
FIG. 4 is an explanatory diagram regarding IGV control of the control device according to the first embodiment.

FIG. 1 is a schematic view illustrating a gas turbine of a first embodiment. FIG. 2 is a graph illustrating a temperature adjustment line on which an upper limit temperature of a flue gas is changed according to a load of the gas turbine. FIG. 3 is a block diagram regarding control of a control device. FIG. 4 is an explanatory diagram regarding IGV control of the control device according to the first embodiment.

A gas turbine (system) 1 of the first embodiment is configured from a compressor 11, a combustor 12, and a turbine 13, as illustrated in FIG. 1. A rotor 18 is arranged to penetrate the central portions of the compressor 11, the combustor 12, and the turbine 13, and the compressor 11 and the turbine 13 are coupled by the rotor 18 to integrally rotate. This gas turbine 1 is controlled by a control device 14. Further, a generator 15 is coupled to the gas turbine 1, and can generate electricity.

The compressor 11 compresses air A taken in through an air intake to obtain compressed air A1. In the compressor 11, an inlet guide vane (IGV) 22 that adjusts an air-suction amount of the air A taken in through the air intake is disposed. The inlet guide vane 22 adjusts the air-suction amount of the air A when the degree of opening of the IGV 22 is adjusted. To be specific, the inlet guide vane 22 includes a plurality of vane bodies 22a, and an IGV operating unit 22b for changing vane angles of the plurality of vane bodies 22a. When the vane angles of the vane bodies 22a are adjusted by the IGV operating unit 22b, the degree of opening of the inlet guide vane 22 is adjusted, whereby the inlet guide vane 22 adjusts the air-suction amount of the air A. When the degree of opening becomes large, the air-suction amount of the air A of the inlet guide vane 22 becomes large, and a pressure ratio of the compressor 11 is increased. On the other hand, when the degree of opening becomes small, the air-suction amount of the air A of the inlet guide vane 22 becomes small, and the pressure ratio of the compressor 11 is decreased.

The combustor 12 supplies a fuel F to the compressed air A1 compressed in the compressor 11, and mixes and burns the compressed air A1 and the fuel F, thereby to generate a combustion gas. The turbine 13 is rotated by the combustion gas generated by the combustor 12.

Both end portions in an axial direction of the rotor 18 are rotatably supported by a bearing unit (not illustrated), and the rotor 18 is rotatably provided around a shaft center. Then, a drive shaft of the generator 15 is coupled with the end portion of the rotor 18 on the compressor 11 side. The generator 15 is provided coaxial with the turbine 13, and can generate electricity as the turbine 13 is rotated.

Therefore, the air A taken in through the air intake of the compressor 11 passes through an interior of the compressor 11 through the inlet guide vane 22 and is compressed, thereby to become the high-temperature and high-pressure compressed air A1. The fuel F is supplied from the combustor 12 to the compressed air A1, and the compressed air A1 and the fuel F are mixed and burned, so that the high-temperature and high-pressure combustion gas is generated. Then, the high-temperature and high-pressure combustion gas generated in the combustor 12 passes through an interior of the turbine 13, thereby to operate (rotate) the turbine 13 to drive and rotate the rotor 18, and drive the generator 15 coupled with the rotor 18. Accordingly, the generator 15 coupled with the rotor 18 generates electricity by being driven and rotated. Meanwhile, the combustion gas that has driven the turbine 13 is discharged into the air as a flue gas.

The operation of such a gas turbine 1 is controlled by the control device 14. To be specific, the control device 14 controls the operation of the gas turbine 1 according to a load (an output of the generator 15) of the gas turbine 1, to be specific, performs part load operation and full load operation of the gas turbine 1. The full load operation is operation where a gas turbine output becomes a rated output. The part load operation is operation where the gas turbine output becomes an output smaller than the rated output.

Further, the control device 14 executes temperature adjustment control by adjusting the air-suction amount of the air A to be taken in to the compressor 11, a fuel supply amount of the fuel F to be supplied from the combustor 12, and the like so that a turbine inlet temperature of the turbine 13 into which the combustion gas flows does not exceed an upper limit temperature set in advance, at the time of part load operation and at the time of full load operation.

The control device 14 executes IGV control to control the IGV operating unit 22b that operates the inlet guide vane 22 in order to adjust the amount of air (air-suction amount) to be taken into the compressor 11. The control device 14 controls the IGV operating unit 22b to change the degree of opening of the inlet guide vane 22, thereby to adjust the air-suction amount of the air A to be taken into the compressor 11. To be specific, the control device 14 performs control such that the degree of opening of the inlet guide vane 22 becomes a rated degree of opening at the time of full load operation. The rated degree of opening is the degree of opening of when the gas turbine output becomes the rated output. Further, the control device 14 can perform control such that the degree of opening of the inlet guide vane 22 becomes a super open state larger than the rated degree of opening.

Further, the control device 14 executes fuel control to control a fuel adjusting valve 35 provided in a fuel supply line 34 through which the fuel F is supplied toward the combustor 12 in order to adjust the supply amount of the fuel F. The control device 14 adjusts the supply amount of the fuel F to be supplied (jetted) to the compressed air A1 by controlling the fuel adjusting valve 35.

Further, measuring instruments such as a manometer 51 and a flue gas thermometer 52 are connected to the control device 14. The manometer 51 is provided in a line in which the compressed air A1 is circulated from the compressor 11 toward the combustor 12, to be specific, inside a casing of the combustor 12, and measures a pressure (casing pressure) of the compressed air A1. The flue gas thermometer 52 is provided a line in which the flue gas discharged from the turbine 13 is circulated, and measures a temperature of the flue gas. To be specific, the flue gas thermometer 52 is configured from a blade path thermometer 52a provided on an upstream side in a flow direction of the flue gas, and a discharge portion thermometer 52b provided downstream of the blade path thermometer 52a.

Then, the control device 14 executes temperature adjustment control along a temperature adjustment line T described below by controlling the inlet guide vane 22, the fuel adjusting valve 35, and the like on the basis of measurement results of the measuring instruments 51 and 52. Here, in the temperature adjustment control, the temperature adjustment line T illustrated in FIG. 2 is used. The temperature adjustment line T is an upper limit temperature of the flue gas defined according to a gas turbine load. That is, in the graph of FIG. 2, the horizontal axis represents the gas turbine load and the vertical axis represents the flue gas temperature. Note that the temperature adjustment line T is a function defined by the flue gas temperature and the pressure ratio of the compressor 11. Therefore, the control device 14 derives the pressure ratio of the compressor 11 on the basis of the measurement result of the manometer 51, and derives the upper limit temperature of the flue gas from the derived pressure ratio on the basis of the temperature adjustment line T.

As illustrated in FIG. 2, the temperature adjustment line T is a line in which the flue gas temperature is decreased as the gas turbine load (to be more specific, the pressure ratio) becomes larger. This temperature adjustment line T is set to the upper limit temperature of the flue gas according to the gas turbine load such that the performance of the gas turbine 1 at a predetermined gas turbine load becomes the rated performance. Therefore, the upper limit temperature of the flue gas is a temperature at which the turbine inlet temperature does not exceed an upper limit temperature set in advance. Note that the rated performance is performance where the work efficiency of the gas turbine 1 becomes optimum when a predetermined load is applied to the gas turbine 1 from the generator 15.

The temperature adjustment line T is a line in which the flue gas temperature (flue gas measured temperature) measured by the flue gas thermometer 52 becomes the upper limit temperature of the temperature adjustment line T at the time of setting the part load operation or the full load operation. That is, the control device 14 performs feedback control (for example, PI control) of the operation of the gas turbine 1 such that the flue gas measured temperature becomes the upper limit temperature of the flue gas.

Here, FIG. 2 illustrates an IGV rated angle line L1 where the inlet guide vane 22 becomes the rated degree of opening. Therefore, the gas turbine load at an intersection point where the temperature adjustment line T and the IGV rated angle line L1 intersect with each other is an intersection point (rated point P) where the gas turbine 1 has a full load, and the gas turbine output according to the gas turbine load at the rated point P is the rated output of the gas turbine 1.

Further, FIG. 2 illustrates a flue gas temperature limiting line L2 serving as a limiting value of the flue gas temperature. The flue gas temperature limiting line L2 indicates a temperature at which members arranged on the discharge side of the turbine 13 can bear a heat load. The control device 14 controls the operation of the gas turbine 1 such that the temperature does not reach the flue gas temperature limiting line L2.

Here, the fuel control and the IGV control by the control device 14 will be more specifically described with reference to FIG. 3. The control device 14 includes an automatic load dispatching regulator (ALR) control unit 61, a load limit control unit 62, a governor control unit 63, a temperature limit control unit 64, a fuel limit control unit 65, a lowest value selection unit 66, a fuel control unit 67, and an IGV control unit 68.

The ALR control unit 61 is input an output demand (output request value) of the gas turbine 1, and generates a load control value for performing load control (ALR control) on the basis of the input output demand. Then, the ALR control unit 61 outputs the generated load control value to the load limit control unit 62 and the governor control unit 63. Although details will be described below, the ALR control unit 61 outputs the load control value to the IGV control unit 68.

The load limit control unit 62 is input the load control value from the ALR control unit 61, and is also input the gas turbine output as an actual output value of the gas turbine 1. The load limit control unit 62 generates a fuel command value that commands the supply amount (fuel flow rate) of the fuel F to be supplied to the combustor 12 on the basis of a deviation of the load control value and the gas turbine output (actual output value) such that the gas turbine output becomes the output demand. Then, the load limit control unit 62 outputs the generated fuel command value to the lowest value selection unit 66.

The governor control unit 63 is input the load control value from the ALR control unit 61, and is also input the gas turbine output and the number of revolutions of the rotor 18. The governor control unit 63 generates a fuel command value on the basis of the load control value, the gas turbine output, and the number of revolutions such that the number of revolutions of the rotor 18 becomes a set number of revolutions set in advance. Then, the governor control unit 63 outputs the generated fuel command value to the lowest value selection unit 66.

The temperature limit control unit 64 is input the flue gas measured temperature measured by the flue gas thermometer 52, and the pressure (casing pressure) inside the casing of the compressor 11, which has been measured by the manometer 51. The temperature limit control unit 64 generates a fuel command value on the basis of the flue gas measured temperature and the casing pressure such that the flue gas measured temperature does not reach the flue gas temperature limiting line L2 illustrated in FIG. 2. Then, the temperature limit control unit 64 outputs the generated fuel command value to the lowest value selection unit 66.

The fuel limit control unit 65 is input the gas turbine output, the number of revolutions of the rotor 18, and the casing pressure. The fuel limit control unit 65 generates a fuel command value on the basis of the gas turbine output, the number of revolutions of the rotor 18, and the casing pressure such that the supply amount of the fuel F to the combustor 12 does not exceed a limit supply amount set in advance. Then, the fuel limit control unit 65 outputs the generated fuel command value to the lowest value selection unit 66.

The lowest value selection unit 66 selects the fuel command value that is the lowest value, of the fuel command values input from the load limit control unit 62, the governor control unit 63, the temperature limit control unit 64, and the fuel limit control unit 65. Then, the lowest value selection unit 66 outputs the fuel command value that is the selected lowest value to the fuel control unit 67.

The fuel control unit 67 is input the fuel command value from the lowest value selection unit 66, and controls the fuel adjusting valve 35 on the basis of the input fuel command value.

The IGV control unit 68 is input the load control value from the ALR control unit 61, and is also input the sucked air temperature of the air A taken in to the compressor 11, the flue gas measured temperature, and the casing pressure. The IGV control unit 68 generates an IGV degree of opening command value for controlling the degree of opening of the inlet guide vane 22, on the basis of these input values. Then, the IGV control unit 68 outputs the generated IGV degree of opening command value to the IGV operating unit 22b.

Next, the IGV control unit 68 will be described with reference to FIG. 4. The IGV control unit 68 is configured from a subtractor 71, a PI controller 72, a controller 73, and an adder 74. As described above, the IGV control unit 68 is input the load control value and the flue gas measured temperature. Note that the IGV control unit 68 is also input the sucked air temperature and the casing pressure, and the degree of opening of the inlet guide vane 22 is controlled according to the input value. However, hereinafter, for simplification of description, description regarding the sucked air temperature and the casing pressure is omitted.

The subtractor 71 generates a deviation A of the flue gas measured temperature and the upper limit temperature of the temperature adjustment line T, and outputs the generated deviation A to the PI controller 72. The PI controller 72 generates an IGV degree of opening command value by which the deviation A becomes zero. The controller 73 generates an IGV degree of opening command value from the output demand corresponding to the input load control value on the basis of a function that associates the output demand with the IGV degree of opening. The adder 74 adds the IGV degree of opening command value generated in the PI controller 72, and the IGV degree of opening command value generated in the controller 73, and outputs the added value to the IGV operating unit 22b. Note that, in the first embodiment, the PI controller has been used. However, an embodiment is not limited thereto as long as the controller is a feedback controller.

The control device 14 configured as described above executes the temperature adjustment control, so that the IGV control unit 68 controls the degree of opening of the inlet guide vane 22. To be specific, the gas turbine 1 executes load increase operation to raise the gas turbine load from a state where the temperature adjustment control is being executed along the temperature adjustment line T by the control device 14 at the time of part load operation. In this case, the control device 14 first sets an output demand according to load increase. When having set the output demand, the control device 14 outputs the output demand to the load limit control unit 62, the governor control unit 63, and the IGV control unit 68 through the ALR control unit 61.

The IGV control unit 68 derives the IGV degree of opening command value on the basis of the load control value corresponding to the output demand, and controls the degree of opening of the inlet guide vane 22 on the basis of the derived IGV degree of opening command value. That is, the IGV control unit 68 performs control such that the degree of opening of the inlet guide vane 22 becomes large on the basis of the output demand at the time of load increase.

Meanwhile, the fuel control unit 67 controls the fuel adjusting valve 35 on the basis of the lowest fuel command value selected in the lowest value selection unit 66 after the fuel command value based on the load control value and the gas turbine output corresponding to the output demand is derived by the load limit control unit 62 and the governor control unit 63. That is, the fuel control unit 67 controls the fuel adjusting valve 35 such that the supply amount of the fuel F is increased on the basis of the output demand and the gas turbine output at the time of load increase.

Therefore, since the degree of opening of the inlet guide vane 22 can be controlled by the IGV control unit 68 on the basis of the output demand, the control device 14 can control the IGV control based on the output demand in advance of the IGV control based on the gas turbine output. That is, since the gas turbine output is an actual output value, the degree of opening of the inlet guide vane 22 is controlled after the combustion of the fuel F, and thus the fuel-air ratio remains at high levels, in the IGV control based on the gas turbine output. Meanwhile, in the IGV control based on the output demand, the degree of opening of the inlet guide vane 22 is controlled before the combustion of the fuel, and thus the fuel-air ratio can remain at low levels.

As described above, according to the first embodiment, the degree of opening of the inlet guide vane 22 can be set on the basis of the output request value (output demand) of the gas turbine 1. Therefore, at the time of load increase of the gas turbine 1, the degree of opening of the inlet guide vane 22 can be made large before the supply amount of the fuel is increased. Therefore, the fuel-air ratio can remain at lower levels than a case of setting the degree of opening of the inlet guide vane 22 on the basis of the gas turbine output. Accordingly, rises of the turbine inlet temperature and the flue gas temperature can be suppressed, and thus limitation on the gas turbine output and occurrence of the load fall due to the flue gas temperature reaching the upper limit temperature can be suppressed at the time of load increase in the part load operation. In this way, at the time of part load operation, the gas turbine output can be easily changed along the temperature adjustment line T according to the load variation, and the part load operation can be performed along the temperature adjustment line T. Therefore, at the time of part load operation, the gas turbine 1 can be operated at rated performance. Note that, in the first embodiment, the system is applied to the gas turbine 1 that generates electricity. However, the system can be applied to a gas engine system or the like.

Second Embodiment

Figure 5:
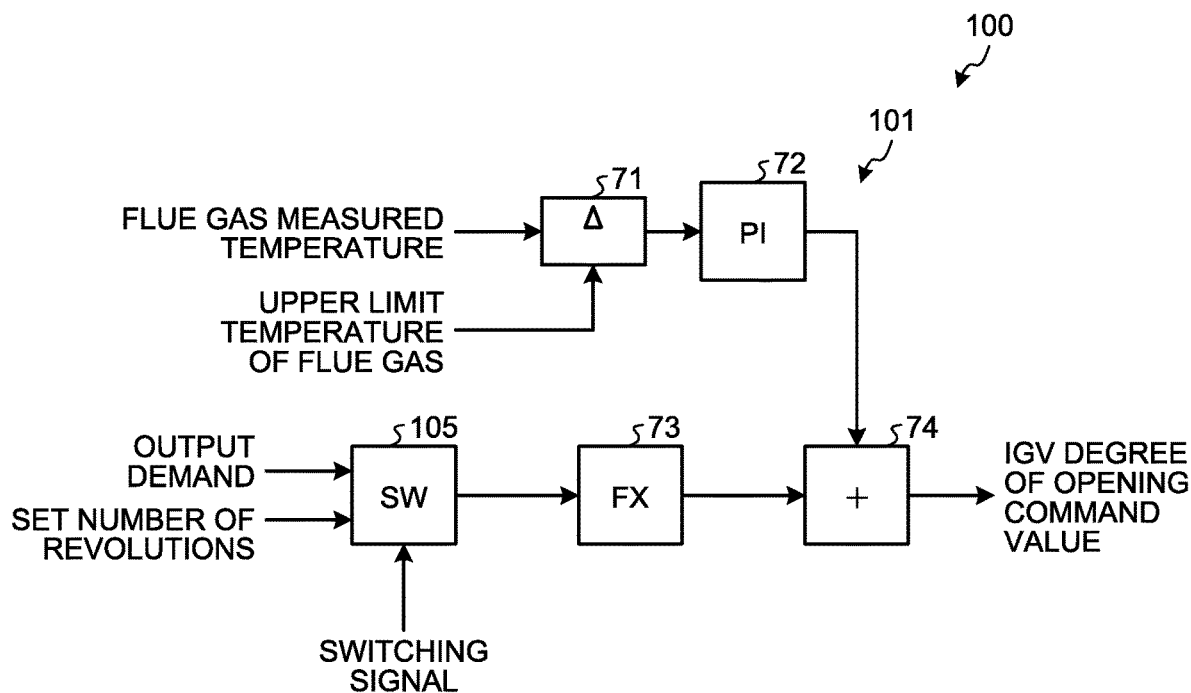
FIG. 5 is an explanatory diagram regarding IGV control of a control device according to a second embodiment.

Next, a control device 100 according to a second embodiment will be described with reference to FIG. 5. FIG. 5 is an explanatory diagram regarding IGV control of a control device according to the second embodiment. Note that, in the second embodiment, portions different from the first embodiment will be described, and portions having similar configurations to the first embodiment are described by being denoted with the same reference signs, to avoid overlapping description. In the second embodiment, the degree of opening of an inlet guide vane 22 is set on the basis of a governor set value corresponding to an output demand at the time of governor control.

The control device 100 of the second embodiment includes a load limit control unit 62 and a governor control unit 63, similarly to the control device 14 of the first embodiment illustrated in FIG. 3. The control device 100 selectively executes operation control of a gas turbine 1 by the load limit control unit 62 and operation control of the gas turbine 1 based on the governor control unit 63 according to an operation state. To be specific, the load limit control unit 62 controls a gas turbine output such that the gas turbine output becomes an output according to the output demand. That is, the load limit control unit 62 controls the gas turbine output such that a deviation of the output demand according to a load control value and the gas turbine output becomes zero. In contrast, the governor control unit 63 controls the gas turbine output such that the number of revolutions of a rotor 18 becomes a set number of revolutions (governor set value) set according to the output demand. That is, the governor control unit 63 controls the gas turbine output such that a deviation of the set number of revolutions according to the load control value serving as the output demand and the number of revolutions of the rotor 18 becomes zero. Therefore, while the load limit control unit 62 performs control such that the gas turbine output becomes constant, the governor control unit 63 performs control such that the number of revolutions becomes constant.

While an IGV control unit 101 of the second embodiment generates an IGV degree of opening command value on the basis of the output demand, similarly to the first embodiment, in a case where the gas turbine 1 is load limit-controlled, the IGV control unit 101 generates the IGV degree of opening command value on the basis of the set number of revolutions in a case where the gas turbine 1 is governor-controlled. To be specific, the IGV control unit 101 includes a subtractor 71, a PI controller 72, a controller 73, an adder 74, and a switching controller 105. Note that the subtractor 71, the PI controller 72, the controller 73, and the adder 74 are similar to those in the first embodiment, and thus description is omitted.

The switching controller 105 is input the load control value corresponding to the output demand (FIG. 5 simply illustrates the load control value as output demand), and the set number of revolutions corresponding to the output demand. Further, the switching controller 105 is input a switching signal that switches the load limit control and the governor control. The switching controller 105 selectively switches the output value to be output to the controller 73 to the load control value or the set number of revolutions (governor set value) on the basis of the input switching signal. Note that the controller 73 generates an IGV degree of opening command value from the output demand corresponding to the input control value on the basis of a function that associates the output demand with the IGV degree of opening, similarly to the first embodiment, and generates an IGV degree of opening command value from the input set number of revolutions on the basis of a function that associates the set number of revolutions with the IGV degree of opening.

As described above, according to the second embodiment, the IGV control unit 101 can set the degree of opening of the inlet guide vane 22 on the basis of the governor set value at the time of governor control. Therefore, even at the time of governor control, at the time of load increase of the gas turbine 1, the degree of opening of the inlet guide vane 22 can be made large and a fuel-air ratio can remain at low levels before a supply amount of a fuel is increased.

Third Embodiment

Figure 6:
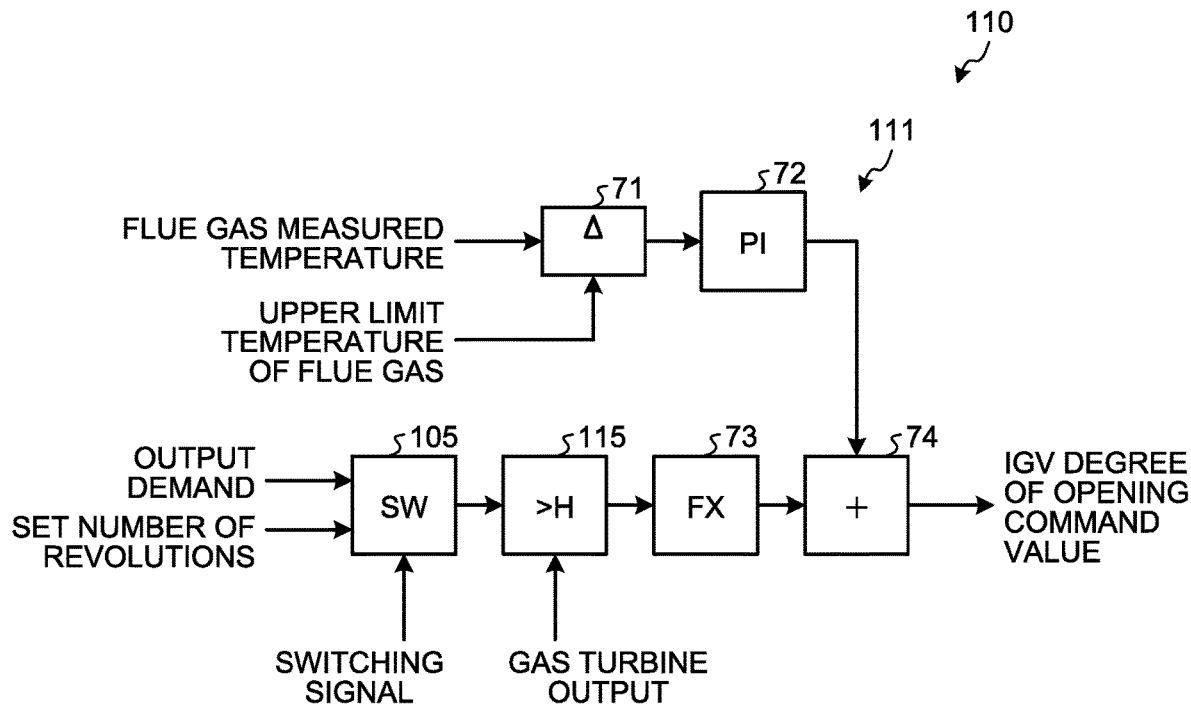
FIG. 6 is an explanatory diagram regarding IGV control of a control device according to a third embodiment.

Next, a control device 110 according to a third embodiment will be described with reference to FIG. 6. FIG. 6 is an explanatory diagram regarding IGV control of a control device according to the third embodiment. Note that, in the third embodiment, portions different from the first and second embodiments will be described, and portions having similar configurations to the first and second embodiments are described by being denoted with the same reference signs, to avoid overlapping description. In the third embodiment, one of an output demand and a gas turbine output is selected, and the degree of opening of an inlet guide vane 22 is set on the basis of the selected output demand or gas turbine output. Hereinafter, the control device 110 of the third embodiment will be described on the basis of the configuration of the control device 100 of the second embodiment.

As illustrated in FIG. 6, in the control device 110 of the third embodiment, an IGV control unit 111 includes a subtractor 71, a PI controller 72, a controller 73, an adder 74, a switching controller 105, and a higher value selection unit 115. Note that the subtractor 71, the PI controller 72, the controller 73, the adder 74, and the switching controller 105 are similar to those in the second embodiment, and thus description is omitted.

The higher value selection unit 115 is input an output demand or a set number of revolutions from the switching controller 105, and is also input a gas turbine output. The higher value selection unit 115 compares the output demand or the set number of revolutions with the gas turbine output, and selects a control value that is a higher value. Then, the higher value selection unit 115 outputs the control value as the selected higher value to the controller 73.

A gas turbine 1 controlled by the control device 110 configured as described above executes load increase operation to raise a gas turbine load from a state where temperature adjustment control is being executed along a temperature adjustment line T by the control device 110 at the time of part load operation. In this case, the control device 110 first sets the output demand according to load increase, and increases a supply amount of a fuel on the basis of the output demand. Therefore, the gas turbine output is increased after combustion of the fuel. Therefore, the gas turbine output becomes a lower value than the output demand, and thus the higher value selection unit 115 of the IGV control unit 111 determines that the output demand is a higher value. Therefore, similarly to the first embodiment, the control device 110 can allow a fuel-air ratio to remain at low levels by opening the degree of opening of the inlet guide vane 22 in advance of the increase in the supply amount of the fuel, by setting the degree of opening of the inlet guide vane 22 on the basis of the output demand by the IGV control unit 111 at the time of load increase.

Meanwhile, the gas turbine 1 executes load decrease operation to fall the gas turbine load from a state where the temperature adjustment control is being executed along the temperature adjustment line T by the control device 110 at the time of part load operation. In this case, the control device 110 first sets the output demand according to load decrease, and decreases the supply amount of the fuel on the basis of the output demand. Therefore, the gas turbine output is decreased after the combustion of the fuel. Therefore, since the gas turbine output becomes a higher value than the output demand, the higher value selection unit 115 of the IGV control unit 111 determines that the gas turbine output is the higher value. Therefore, the control device 110 can allow a fuel-air ratio to remain at low levels by closing the degree of opening of the inlet guide vane 22 after the decrease in the supply amount of the fuel by setting the degree of opening of the inlet guide vane 22 on the basis of the gas turbine output by the IGV control unit 111 at the time of load decrease.

As described above, according to the third embodiment, not only at the time of load increase but also at the time of load decrease, the fuel-air ratio can remain at low levels. Therefore, at the time of load increase and at the time of load decrease, rises of the turbine inlet temperature and the flue gas temperature can be suppressed, and thus limitation on the gas turbine output due to the flue gas temperature reaching the upper limit temperature can be suppressed.

Fourth Embodiment

Figure 7:
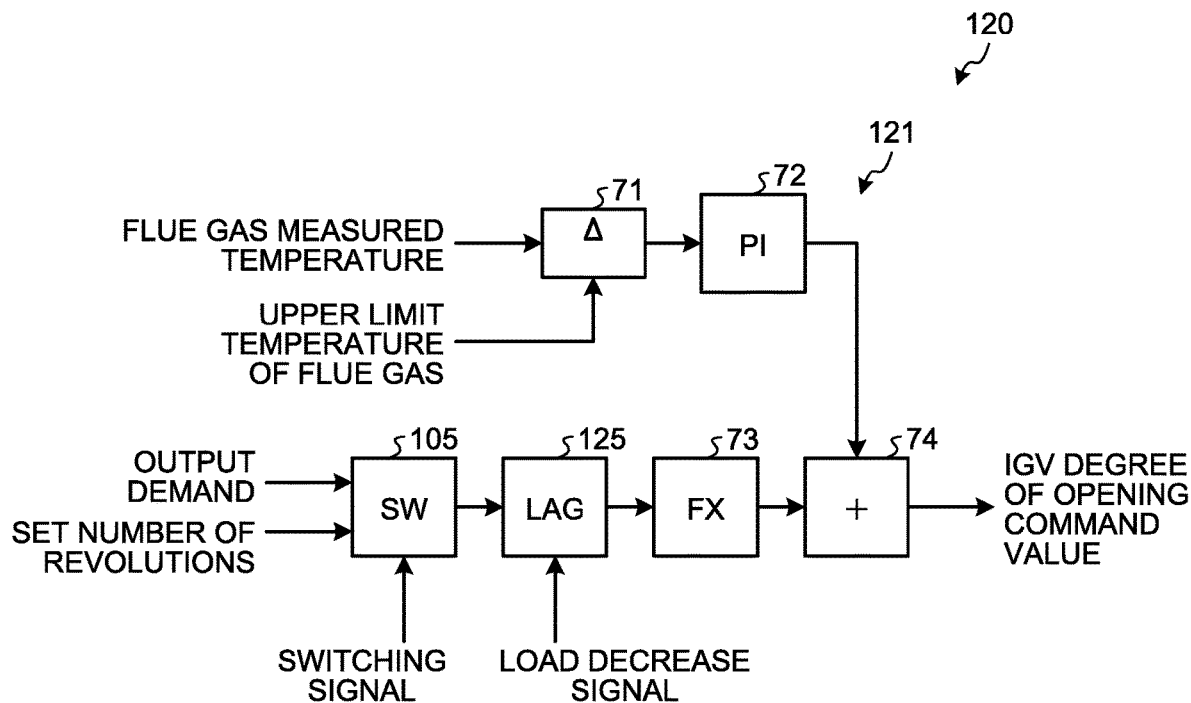
FIG. 7 is an explanatory diagram regarding IGV control of a control device according to a fourth embodiment.

Next, a control device 120 according to a fourth embodiment will be described with reference to FIG. 7. FIG. 7 is an explanatory diagram regarding IGV control of a control device according to the fourth embodiment. Note that, in the fourth embodiment, portions different from the first to third embodiments will be described, and portions having similar configurations to the first to third embodiments are described by being denoted with the same reference signs, to avoid overlapping description. In the fourth embodiment, the degree of opening of an inlet guide vane 22 is set in a delayed manner at the time of load decrease. Hereinafter, the control device 120 of the fourth embodiment will be described on the basis of the configuration of the control device 100 of the second embodiment.

As illustrated in FIG. 7, in the control device 120 of the fourth embodiment, an IGV control unit 121 includes a subtractor 71, a PI controller 72, a controller 73, an adder 74, a switching controller 105, and a delay controller 125. Note that the subtractor 71, the PI controller 72, the controller 73, the adder 74, and the switching controller 105 are similar to those in the second embodiment, and thus description is omitted.

The delay controller 125 is input an output demand or a set number of revolutions from the switching controller 105. The delay controller 125 is input a load decrease signal output at the time of load decrease operation of a gas turbine 1. In a case where no load decrease signal is input, that is, in a case where the gas turbine 1 performs operation at the time of load increase operation or at the time of setting a load, the delay controller 125 outputs a control value input from the switching controller 105 to the controller 73 without time delay. Meanwhile, in a case where the load decrease signal is input, that is, in a case where the gas turbine 1 performs the load decrease operation, the delay controller 125 outputs the control value input from the switching controller 105 to the controller 73 with time delay.

The gas turbine 1 controlled by the control device 120 configured as described above executes the load decrease operation to fall the gas turbine load from a state where temperature adjustment control being executed along a temperature adjustment line T by the control device 120 at the time of part load operation. In this case, the control device 120 sets the output demand according to the load decrease, and decreases a supply amount of a fuel on the basis of the output demand. Therefore, the gas turbine output is decreased after combustion of the fuel. The control device 120 can allow a fuel-air ratio to remain at low levels by closing the degree of opening of the inlet guide vane 22 after the decrease in the supply amount of the fuel by setting the degree of opening of the inlet guide vane 22 in a delayed manner by the delay controller 125 of the IGV control unit 121 at the time of load decrease. That is, the delay controller 125 delays the control value input from the switching controller 105 and outputs the control value to the controller 73 such that the degree of opening of the inlet guide vane 22 is set after the decrease in the supply amount of the fuel.

As described above, according to the fourth embodiment, not only at the time of load increase but also at the time of load decrease, the fuel-air ratio can remain at low levels. Therefore, at the time of load increase and at the time of load decrease, rises of the turbine inlet temperature and the flue gas temperature can be suppressed, and thus limitation on the output of the gas turbine due to the flue gas temperature reaching the upper limit temperature can be suppressed.

Fifth Embodiment

Figure 8:
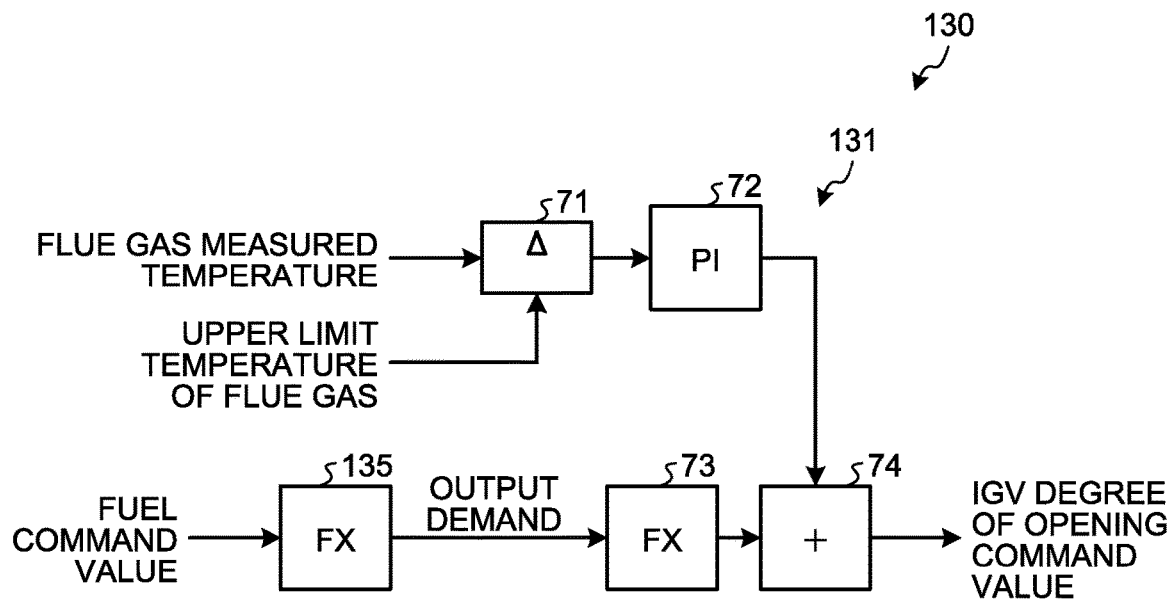
FIG. 8 is an explanatory diagram regarding IGV control of a control device according to a fifth embodiment.

Next, a control device 130 according to a fifth embodiment will be described with reference to FIG. 8. FIG. 8 is an explanatory diagram regarding IGV control of a control device according to the fifth embodiment. Note that, in the fifth embodiment, portions different from the first to fourth embodiments will be described, and portions having similar configurations to the first to fourth embodiments are described by being denoted with the same reference signs, to avoid overlapping description. In the fifth embodiment, the degree of opening of an inlet guide vane 22 is set on the basis of an output demand derived from a fuel command value. Hereinafter, the control device 130 of the fifth embodiment will be described on the basis of the configuration of the control device 14 of the first embodiment.

As illustrated in FIG. 8, an IGV control unit 131 of the control device 130 includes a subtractor 71, a PI controller 72, a first controller 73, an adder 74, and a second controller 135. Note that the subtractor 71, the PI controller 72, the first controller 73, and the adder 74 are similar to those in the first embodiment, and thus description is omitted.

The second controller 135 is input a fuel command value output from the lowest value selection unit 66. The second controller 135 generates an output demand from an input fuel command value on the basis of a function that associates the fuel command value with the output demand, and outputs the generated output demand to the first controller 73.

As described above, according to the fifth embodiment, the degree of opening of the inlet guide vane 22 can be set on the basis of the fuel command value. Therefore, at the time of load increase of the gas turbine 1, the degree of opening of the inlet guide vane 22 can be made large before the supply amount of the fuel is increased. Therefore, a fuel-air ratio can remain at lower levels than a case of setting the degree of opening of the inlet guide vane 22 on the basis of a gas turbine output.

Sixth Embodiment

Figure 9:
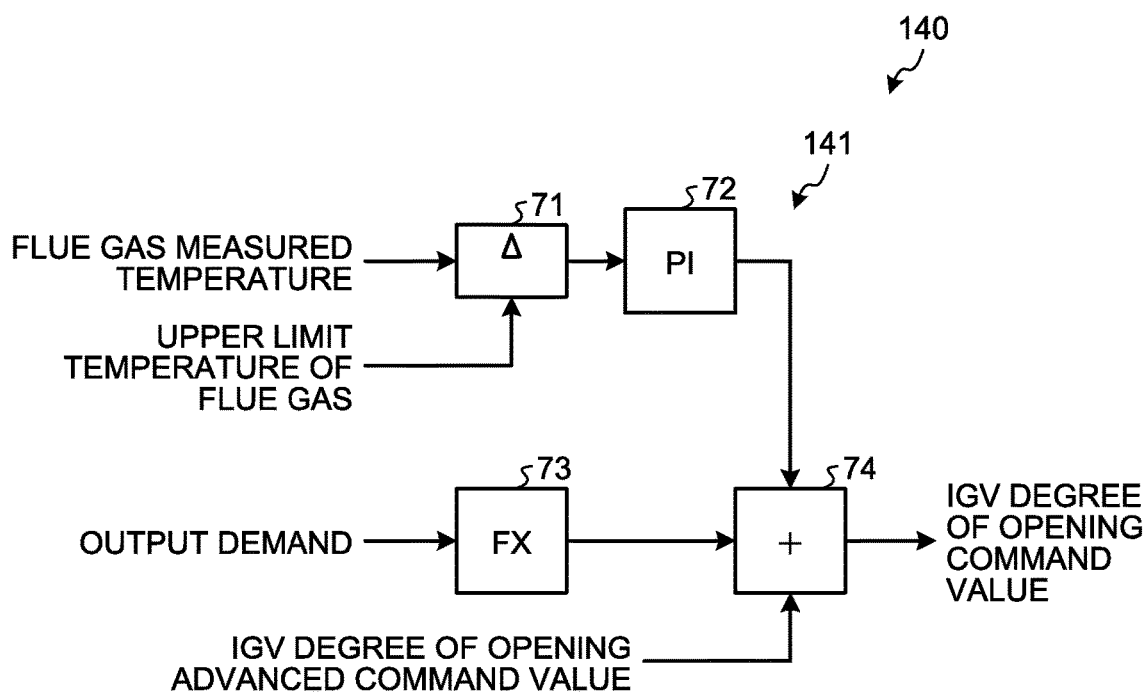
FIG. 9 is an explanatory diagram regarding IGV control of a control device according to a sixth embodiment.

Next, a control device 140 according to a sixth embodiment will be described with reference to FIG. 9. FIG. 9 is an explanatory diagram regarding IGV control of a control device according to the sixth embodiment. Note that, in the sixth embodiment, portions different from the first to fifth embodiments will be described, and portions having similar configurations to the first to fifth embodiments are described by being denoted with the same reference signs, to avoid overlapping description. In the sixth embodiment, an IGV degree of opening advanced command value by which the degree of opening of an inlet guide vane 22 is opened in advance is input to an adder 74. Hereinafter, the control device 140 of the sixth embodiment will be described on the basis of the configuration of the control device 14 of the first embodiment.

As illustrated in FIG. 9, in an IGV control unit 141 of the control device 140, the adder 74 is input an IGV degree of opening command value generated in a PI controller 72, an IGV degree of opening command value generated in a controller 73, and the IGV degree of advanced opening command value. Here, the IGV degree of opening advanced command value is a command value for causing the degree of opening of the inlet guide vane 22 to become larger than the degree of opening corresponding to an output demand, in a case where a change amount of load variation of a gas turbine 1 is large. Note that the IGV degree of opening advanced command value is not limited, and a degree of opening advanced setting of a conventional inlet guide vane 22 may be applied. Then, the adder 74 outputs, to the IGV operating unit 22b, the IGV degree of opening command value after the IGV degree of opening advanced command value is added.

As described above, according to the sixth embodiment, an upper limit temperature of a temperature adjustment line T quickly falls with load increase in a case where the load change amount is large. In this case, since the flue gas temperature is decreased in a delayed manner, the flue gas temperature is limited to the upper limit temperature, and it becomes difficult to change the gas turbine output, accordingly. Therefore, the IGV control unit 141 can decrease the flue gas temperature to become lower than the upper limit temperature of the temperature adjustment line T by executing degree of opening advanced control so that the degree of opening of the inlet guide vane 22 becomes larger, in a case where the load change amount at the time of load increase is large. Therefore, the gas turbine output can be favorably changed without limiting the flue gas temperature to the temperature adjustment line T. Note that when the change amount of the load variation is large is at the time of quick start operation of the gas turbine 1 or at the time of frequency variation of a generator 15, for example.

REFERENCE SIGNS LIST

1 GAS TURBINE
11 COMPRESSOR
12 COMBUSTOR
13 TURBINE
14 CONTROL DEVICE
15 GENERATOR
18 ROTOR
22 INLET GUIDE VANE
22a VANE BODY
22b IGV OPERATING UNIT
34 FUEL SUPPLY LINE
35 FUEL ADJUSTING VALUE
51 MANOMETER
52 FLUE GAS THERMOMETER
52a BLADE PATH THERMOMETER
52b DISCHARGE PORTION THERMOMETER
61 ALR CONTROL UNIT
62 LOAD LIMIT CONTROL UNIT
63 GOVERNOR CONTROL UNIT
64 TEMPERATURE LIMIT CONTROL UNIT
65 FUEL LIMIT CONTROL UNIT
66 LOWEST VALUE SELECTION UNIT
67 FUEL CONTROL UNIT
68 IGV CONTROL UNIT
71 SUBTRACTOR
72 PI CONTROLLER
73 CONTROLLER
74 ADDER
100 CONTROL DEVICE (SECOND EMBODIMENT)
101 IGV CONTROL UNIT (SECOND EMBODIMENT)
105 SWITCHING CONTROLLER
110 CONTROL DEVICE (THIRD EMBODIMENT)
111 IGV CONTROL UNIT (THIRD CONTROLLER)
115 HIGHER VALUE SELECTION UNIT
120 CONTROL DEVICE (FOURTH EMBODIMENT)
121 IGV CONTROL UNIT (FOURTH EMBODIMENT)

125 DELAY CONTROLLER
130 CONTROL DEVICE (FIFTH EMBODIMENT)
131 IGV CONTROL UNIT (FIFTH EMBODIMENT)
140 CONTROL DEVICE (SIXTH EMBODIMENT)
141 IGV CONTROL UNIT (SIXTH EMBODIMENT)
A AIR
F FUEL
A1 COMPRESSED AIR
T TEMPERATURE ADJUSTMENT LINE
L1 IGV RATED ANGLE LINE
L2 FLUE GAS TEMPERATURE LIMITING LINE
P RATED POINT

The invention claimed is:

1. A control device of a system wherein the system is configured to compress a suctioned air with a compressor to obtain compressed air, mix a fuel supplied from a combustor with the compressed air to burn the fuel and the compressed air to obtain a combustion gas, operate a turbine with the combustion gas to rotate a rotor, and discharge the combustion gas that has operated the turbine as a flue gas, wherein:

the compressor includes an inlet guide vane capable of adjusting a degree of opening, the inlet guide vane being on an air-suction side, the control device is configured to execute temperature adjustment control to control the degree of opening of the inlet guide vane along a temperature adjustment line indicating an upper limit temperature of a flue gas temperature defined according to a load of the system, the control device is configured to compare an actual output value of the system and an output request value of the system, and select a higher value from among the actual output value of the system and the output request value of the system, the control device is configured to set the degree of opening of the inlet guide vane based on the higher value from among the actual output value of the system and the output request value of the system, and the control device is configured to execute governor control in which the actual output value of the system is controlled based on a governor set value with which a number of revolutions of the rotor becomes a set number of revolutions, wherein the output request value of the system is the governor set value at a time of the governor control such that the setting of the degree of opening of the inlet guide vane is based on the governor set value.

2. The control device according to claim 1, wherein:

the control device is configured to execute fuel control in which a supply amount of the fuel supplied from the combustor is controlled based on a fuel command value, and the control device is configured to generate the output request value of the system based on the fuel command value.

3. A system configured to be controlled by the control device according to claim 1, the system comprising:

the compressor configured to compress the suctioned air to obtain the compressed air;

the combustor configured to supply the fuel to the compressed air to burn the fuel and the compressed air to generate the combustion gas;

the turbine that is operated by the combustion gas; and the control device according to claim 1.

4. A method of controlling a system wherein the system compresses a suctioned air with a compressor to obtain compressed air, mixes a fuel supplied from a combustor with the compressed air to burn the fuel and the compressed air to obtain a combustion gas, operates a turbine with the combustion gas to rotate a rotor, and discharges the combustion gas that has operated the turbine as a flue gas, wherein:

the compressor includes an inlet guide vane capable of adjusting a degree of opening, the inlet guide vane being on an air-suction side, and the method comprises:

executing temperature adjustment control to control the degree of opening of the inlet guide vane along a temperature adjustment line indicating an upper limit temperature of a flue gas temperature defined according to a load of the system, comparing an actual output value of the system and an output request value of the system, and selecting a higher value from among the actual output value of the system and the output request value of the system, setting the degree of opening of the inlet guide vane based on the higher value from among the actual output value of the system and the output request value of the system, and executing governor control in which the actual output value of the system is controlled based on a governor set value with which a number of revolutions of the rotor becomes a set number of revolutions, wherein the output request value of the system is the governor set value at a time of the governor control such that the setting of the degree of opening of the inlet guide vane is based on the governor set value.

* * * * *